US012465763B2

(12) United States Patent
McLachlan et al.

(10) Patent No.: US 12,465,763 B2
(45) Date of Patent: Nov. 11, 2025

(54) DEVICES AND METHODS FOR ADJUSTING AND TRACKING RESPIRATION-STIMULATING ELECTRODES

(71) Applicant: Liberate Medical, LLC, Crestwood, KY (US)

(72) Inventors: Angus McLachlan, Louisville, KY (US); Guillermo Cohen, Crestwood, KY (US); Michael Herda, Boxford, MA (US)

(73) Assignee: Liberate Medical, LLC, Crestwood, KY (US)

( * ) Notice: Subject to any disclaimer, the term of this patent is extended or adjusted under 35 U.S.C. 154(b) by 284 days.

(21) Appl. No.: 17/763,796

(22) PCT Filed: Sep. 25, 2020

(86) PCT No.: PCT/US2020/052655
§ 371 (c)(1),
(2) Date: Mar. 25, 2022

(87) PCT Pub. No.: WO2021/062109
PCT Pub. Date: Apr. 1, 2021

(65) Prior Publication Data
US 2022/0362550 A1 Nov. 17, 2022

Related U.S. Application Data

(60) Provisional application No. 62/907,150, filed on Sep. 27, 2019.

(51) Int. Cl.
*A61N 1/36* (2006.01)
*A61N 1/02* (2006.01)
(Continued)

(52) U.S. Cl.
CPC .......... *A61N 1/3601* (2013.01); *A61N 1/025* (2013.01); *A61N 1/0452* (2013.01);
(Continued)

(58) Field of Classification Search
None
See application file for complete search history.

(56) References Cited

U.S. PATENT DOCUMENTS 5,255,677 A 10/1993 Schaefer et al.
5,456,710 A 10/1995 Gadsby et al.
(Continued)

OTHER PUBLICATIONS

McCaughey et al., "Optimal electrode position for abdominal functional electrical stimulation," Jul. 19, 2018, J Appl Physiol, 125:1062-1068. (Year: 2018).*
(Continued)

*Primary Examiner* — Michael W Kahelin
(74) *Attorney, Agent, or Firm* — Dinsmore & Shohl LLP

(57) ABSTRACT

An electrode for stimulating a neuromuscular response includes a backing layer, an electrode layer, and a hydrogel layer, and an electrode cable configured to provide an electrical signal to the electrode. The electrode is divided into a first removable portion including a first removable activation area, a second removable portion including a second removable activation area, and a main body including a main activation area, the first removable portion is configured to separate from the second removable portion and the main body by a first perforation, and the second removable portion is configured to separate from the main body by a second perforation.

19 Claims, 6 Drawing Sheets

(51) Int. Cl.
  *A61N 1/04* (2006.01)
  *A61N 1/378* (2006.01)
(52) U.S. Cl.
  CPC ........ *A61N 1/0456* (2013.01); *A61N 1/0476* (2013.01); *A61N 1/0496* (2013.01); *A61N 1/36034* (2017.08); *A61N 1/378* (2013.01)

(56) References Cited

U.S. PATENT DOCUMENTS

| | | | | |
|---|---|---|---|---|
| 5,924,983 | A * | 7/1999 | Takaki | H01B 1/24 |
| | | | | 600/397 |
| 6,240,323 | B1 | 5/2001 | Calenzo, Sr. et al. | |
| 6,714,824 | B1 * | 3/2004 | Ohta | A61N 1/046 |
| | | | | 607/142 |
| 6,965,799 | B2 | 11/2005 | Nova et al. | |
| 7,215,989 | B1 | 5/2007 | Burks | |
| 8,255,056 | B2 | 8/2012 | Tehrani | |
| 2003/0017179 | A1 | 1/2003 | Akaishi | |
| 2003/0018195 | A1 | 1/2003 | Konradi et al. | |
| 2003/0171797 | A1 * | 9/2003 | Nova | A61B 5/266 |
| | | | | 607/142 |
| 2003/0181950 | A1 | 9/2003 | Powers et al. | |
| 2004/0162586 | A1 * | 8/2004 | Covey | A61N 1/0472 |
| | | | | 607/5 |
| 2005/0028321 | A1 | 2/2005 | Rude | |
| 2009/0076365 | A1 * | 3/2009 | Grassl | A61B 5/25 |
| | | | | 607/149 |
| 2011/0005428 | A1 | 1/2011 | Heo et al. | |
| 2011/0054286 | A1 | 3/2011 | Crosby | |
| 2016/0136415 | A1 * | 5/2016 | Bunch | A61N 1/3904 |
| | | | | 607/142 |
| 2016/0158527 | A1 * | 6/2016 | Jensen | A61N 1/0492 |
| 2019/0175908 | A1 * | 6/2019 | Thakkar | A61N 1/3601 |
| 2022/0096825 | A1 * | 3/2022 | McDonald | G06K 7/10297 |

OTHER PUBLICATIONS

International Search Report mailed Dec. 31, 2020 in reference to co-pending PCT Application No. PCT/US2020/52655 filed Sep. 25, 2020.
Written Opinion mailed Dec. 31, 2020 in reference to co-pending PCT Application No. PCT/US2020/52655 filed Sep. 25, 2020.
"Optical Electrode Position for Abdominal Functional Electrical Stimulation" (Mccaughey et al.) 16-20 Jul. 19, 2018 (Jul. 19, 2018) [online] (retrieved from the internet on Nov. 30, 2020).
EP Extended European Search Report dated Oct. 4, 2023 pertaining to EP application No. 20869393.7 filed Apr. 22, 2022, pp. 1-7.

* cited by examiner

DEVICES AND METHODS FOR ADJUSTING AND TRACKING RESPIRATION-STIMULATING ELECTRODES

CROSS-REFERENCE TO RELATED APPLICATIONS

This application is a § 371 National Stage Application of International Application Serial No. PCT/US2020/052655, filed Sep. 25, 2020, and claims the benefit of U.S. Provisional Application Ser. No. 62/907,150, filed Sep. 27, 2019, and entitled Methods and Apparatus for Adjusting the Size and Tracking the Use of Electrodes, each of which is incorporated herein by reference in its entirety.

STATEMENT REGARDING FEDERALLY SPONSORED RESEARCH AND DEVELOPMENT

This invention was made with government support under 1632402 awarded by the National Science Foundation. The government has certain rights in the invention.

TECHNICAL FIELD

The present specification generally relates to devices and methods for adjusting the size and tracking the use of electrodes and, more specifically, to devices and methods for adjusting the size and tracking the use of electrodes that stimulate a response from a subject's neuromuscular system.

BACKGROUND

People experiencing neuromuscular or respiratory disorders may experience muscular fatigue and difficulty breathing. Such symptoms may be associated with extended periods of inactivity (e.g., during extended hospital stays) or require mechanical ventilation ("MV"). Long periods of inactivity and/or MV can further exacerbate respiratory fatigue due to deep muscle weakness, loss of deep reflexes, and/or decrement of deep and superficial sensitivity. These exacerbated problems may lead to even less activity or deeper dependence on MV. Accordingly, alternative methods of stimulating respiratory function are required.

SUMMARY

In one embodiment, an electrode for stimulating a neuromuscular response includes a backing layer, an electrode layer, and a hydrogel layer, and an electrode cable configured to provide an electrical signal to the electrode. The electrode is divided into a first removable portion including a first removable activation area, a second removable portion including a second removable activation area, and a main body including a main activation area, the first removable portion is configured to separate from the second removable portion and the main body by a first perforation, and the second removable portion is configured to separate from the main body by a second perforation.

In another embodiment, a system for stimulating respiration includes a controller; a power supply; a memory device; and at least one electrode pair, each electrode of the at least one electrode pair including a backing layer, an electrode layer, and a hydrogel layer; and an electrode cable configured to provide an electrical signal to the electrode. The controller controls the electrical signal to each of the electrodes from the power supply through the respective electrode cable and the controller is communicatively coupled with the memory device, each of the electrodes is divided into a first removable portion including a first removable activation area, a second removable portion including a second removable activation area, and a main body including a main activation area, the first removable portion is configured to separate from the second removable portion and the main body by a first perforation, and the second removable portion is configured to separate from the main body by a second perforation.

In yet another embodiment, a method of treating a respiratory disorder in a subject using neuromuscular electrical stimulation includes providing a controller, a power supply, and at least one electrode pair, each electrode of the electrode pair comprising: a backing layer, an electrode layer, a hydrogel layer, and an electrode cable configured to provide an electrical signal to the electrode, each electrode being divided into a first removable portion including a first removable activation area, a second removable portion including a second removable activation area, and a main body including a main activation area; generating an electrical signal using the controller and the power supply; and supplying the electrical signal to each of the electrodes of the at least one electrode pair to provide an electrical stimulus.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
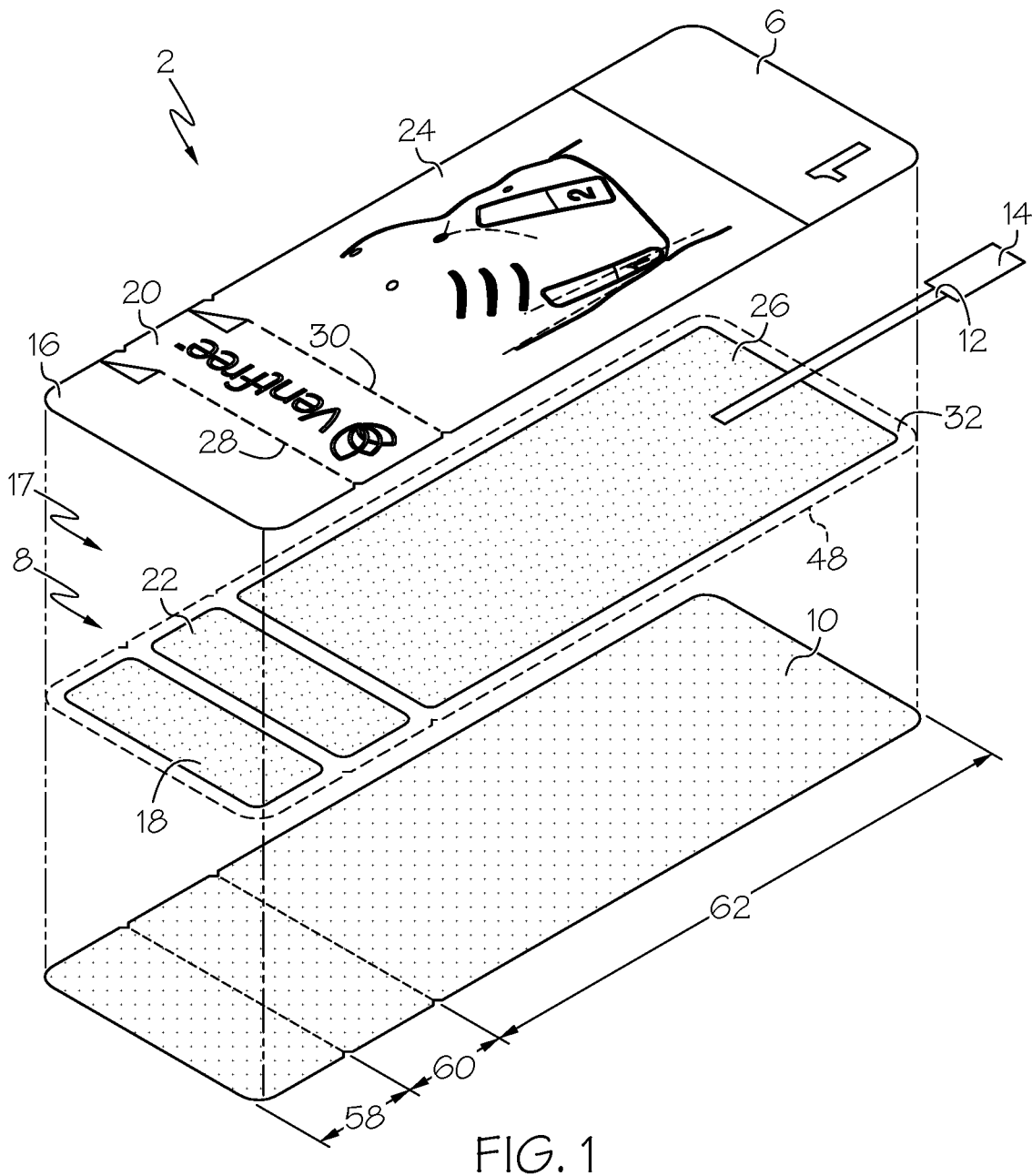
FIG. 1 depicts a system for assisting the respiratory function of a subject according to one or more embodiments shown and described herein.

Disorders affecting the respiratory system are significant causes of morbidity and mortality. Respiratory disorders such as, for example, chronic obstructive lung disease (COPD) and Coronavirus disease 2019 (COVID-19) are common diseases whose prevalence may continue to rise considerably. COPD, COVID-19, and other respiratory disorders can have debilitating effects on a patient's daily functioning and quality of life. Pharmacological therapies such as bronchodilators and corticosteroids may be widely used to treat respiratory disorders. A variety of non-pharmacological treatment modalities may also be available. However, a significant proportion of patients experience persistent symptoms despite such interventions. Accordingly, there is a need for innovative approaches to help manage respiratory disorders.

One potential innovative approach to treat such disorders is to utilize transcutaneous neuromuscular electrical stimulation (NMES). Embodiments of the apparatuses and systems described herein may utilize NMES to apply an electrical stimulation to any anatomical area of a subject to cause a muscle to contract or to activate a nerve. For example, NMES may electrically stimulate the abdominal wall muscles during the expiratory phase of breathing in order to assist a subject's breathing. The stimulation may be applied, for example, during a regular routine such as a number of sessions per day, number of days per week, for a period of weeks. If NMES is used to supplement MV, NMES may be applied until a patient is weaned from mechanical ventilation (MV). In addition to stimulating cardiovascular system (e.g., through muscular and nerve stimulation) applications of the embodiments or principles of the apparatuses and systems described herein may be used in applications associated with electrocardiograms, electromyograms, defibrillation, etc.

NMES may be used to cause the abdominal wall muscles to contract in synchrony with exhalation. During NMES, small electrical impulses may be applied to muscles or motor nerves supplying a muscle to elicit a contraction of the muscles. The impulses may be generated by a device and delivered through electrodes positioned in close proximity to the muscles to be stimulated and/or in close proximity to efferent nerves that supply such muscles. The electrodes may be positioned on the skin and may be positioned directly over the muscles and/or nerves to be stimulated. The device causes muscles to contract (typically repeatedly) by applying pulsed electric current through the cutaneous electrodes. NMES may be used for various purposes besides respiratory disorders, such as in physical rehabilitation after injury, pain management, and in sports training. As NMES does not require patient cooperation, therapy can begin during the early phase of MV while patients are sedated or delirious.

Devices disclosed herein may provide devices capable of interacting with systems capable of NMES. Such systems may generally consist of one or more stimulators, one or more control units, one or more flow sensors, and one or more electrodes. The control unit may control the general device, stimulation hardware, and peripheral handling. The flow sensor may, for example, measure the flow rate through the flow sensor using, for example, a differential pressure transducer in a controller board. The flow sensor may be connected in series with the patient's airway path to the ventilator to provide measurement of the patient's breathing. The flow sensor may be, for example, a variable orifice type pneumotachograph which may measure bi-directional flow, proximal to the patient's airway. The flow sensor may use a variable orifice design to produce a differential pressure signal that is proportional to the flow rate of air running through the flow sensor.

A microcontroller inside the control unit may read the output of the flow sensor and may generate a stimulation trigger during the patient's breath cycle based on one or more criteria. For example, the control unit may generate a stimulation trigger according to a stimulation trigger algorithm.

Stimulation may be applied to a patient through one or more pairs of electrodes connecting the patient to the stimulator. The electrodes may generally consist of four rectangular stimulation electrodes and may deliver bilateral stimulation to the abdominal wall muscles. Some abdominal muscles of interest in various embodiments are the rectus abdominis muscle, the external oblique, the internal oblique, and the transversus abdominis. The rectus abdominis muscle is a paired muscle running vertically on each side of the anterior wall of the human abdomen (and in some other animals). The external oblique muscle (also external abdominal oblique muscle) is the largest and the most superficial (outermost) of the three flat muscles of the lateral anterior abdomen. The internal oblique muscle is the intermediate muscle of the abdomen, lying just underneath the external oblique and just above (superficial to) the transverse abdominal muscle. The transversus abdominis muscle is a muscle layer of the anterior and lateral abdominal wall which is deep to (layered below) the internal oblique muscle. Nerves supplying one or more abdominal muscles include the inferior five intercostal, subcostal, and iliohypogastric nerves. In some embodiments, the electrodes may apply electrical stimulation to other parts of a patient's body. For example, electrical stimulation may be applied to the quadriceps. Additionally, electrodes may be coupled to one, two, or more pulse generators and/or current or voltage sources may be provided, e.g., to permit convenient delivery of multiple stimuli.

The number, shape, and position of the electrodes can vary and may be selected by one of skill in the art. In the particular embodiments pictured herein, 4 electrodes are used, but embodiments are not limited to this number of electrodes. For example, in some embodiments, between 2 and 16 electrodes may be used. In some embodiments, between 3 and 8 electrodes are used. Additionally, the electrodes in the pictured embodiments disclosed herein include a generally rectangular shape but embodiments are not limited to this shape. For example, the electrodes may be substantially square, rectangular, circular, or have other shapes.

Exemplary lengths of the sides of a rectangular electrode may range, e.g., from about 4 cm-20 cm. In some embodiments, at least some of the electrodes may be elongated strip-like shape (e.g., about 4-6 cm wide and about 12-20 cm long). In some embodiments, the dimensions of the electrode may change, as will be described in greater detail herein. The position of one or more of the stimulating electrodes may be selected so as to predominantly stimulate, e.g., the rectus abdominis muscle, or portions thereof In some embodiments, the external abdominal oblique, the internal abdominal oblique, and the transversus abdominis may be stimulated. In some embodiments, the rectus abdominus may be stimulated. In some embodiments, electrodes may be positioned on the abdomen under the costal margin and above the symphysis bone. In some embodiments, a plurality of electrodes may be positioned approximately symmetrically around the midline. In some embodiments, a single electrode may be positioned approximately on the mid-line, and one or more electrodes are approximately symmetrically placed on each side of the midline (e.g., one on each side or two on each side). In some embodiments, an electrode or arrangement of electrodes may be approximately V-shaped and symmetrically positioned about the subject's midline with the apex pointing downwards. In some embodiments, one or more pairs of elongated, strip-like electrodes may, for example, be placed so that they run diagonally downwards under costal margin on each side of the midline. In some embodiments, electrodes are positioned on the posterior thorax, so that they stimulate the nerve roots supplying muscles of expiration. It will be appreciated that a current may be delivered via one or more of the electrodes and returned via different electrodes. Further, not all of the electrodes may be "active" during any given breathing cycle. For example, it may be desirable to alternate between stimulating primarily two or more different muscles or groups of muscles in alternate breathing cycles or in successive breathing cycles during which a stimulus is delivered.

The characteristics of the electrical stimulus (also referred to herein as "stimulus parameters") can be selected by one of skill in the art to cause contraction of at least some expiratory muscles without causing untoward effects such as unacceptable discomfort or heat. Characteristics of the stimulus that may be selected include, e.g., frequency, amplitude, duty cycle, pulse shape, pulse width, pulse duration, etc. In some embodiments, a stimulus delivered in synchrony with exhaling comprises a pulse train delivered at between 1 Hz and 200 Hz, with an amplitude of stimulation between 30 mA and 500 mA, and a pulse width between 10 us and 100 µs, for a duration between 0.1 seconds and 3 seconds. In some embodiments, a voltage is between 0.1 V and 5 V. It will be understood that a variety of suitable combinations of parameters can be selected within the foregoing ranges or outside these ranges. In some embodiments a pulse width of between 100 µs and 1,000 µs may be used. In some embodiments, a voltage between 5 V and 300 V may be used. In some embodiments, a voltage between 50 and 200 V, e.g., about 100-150 V, may be used. In some embodiments, a voltage up to approximately 300 V and/or currents up to around 100 mA may be used with a stimulation period of about, e.g., 0.1 to 0.5 ms. In some embodiments, high voltage stimulation voltages up to 1000 V and/or currents up to over 1000 mA may be used, e.g., with a very brief stimulus duration. If the stimuli are delivered externally, stimulus parameters may be selected based at least in part on the different depth within the body to which the stimulus is to be delivered.

In some embodiments, a stimulus delivered in synchrony with an exhalation consists of a single pulse. In some embodiments, the amplitude of the pulse or pulses varies within the exhalation. For example, the pulses may be triangular, square, rectangular, sinusoidal, partial sinusoidal, sawtooth, etc. In some embodiments in which multiple pulses are delivered within an exhalation period, the pulse width can vary. Variation of pulse magnitude and/or width can be linear. For example, a pulse train may begin at a 25 µs pulse width and increase in a linear manner to a pulse width of about 300-400 µs over a 1 second period of stimulation at, e.g., 50 Hz. Non-limiting examples of stimulus parameters are: (1) 1-second pulse train at 45 Hz, amplitude of stimulation 60-100 mA, and pulse width 25 µs; (2) single pulse, amplitude of stimulation between 50 mA and 450 mA, pulse width 200 µs. In some embodiments, the stimulus parameters are selected to cause gradual rather than abrupt contraction of the muscles, e.g., by using a varying (increasing) pulse width and/or amplitude within a stimulus period.

In some embodiments, stimuli having different characteristics may be delivered to different muscles using different electrodes. Furthermore, different stimuli may be delivered to different portions of a muscle. For example, stimulus parameters appropriate to stimulate and cause contraction of the upper portion of the abdominis rectus, lower portion of the abdominis rectus, transversus abdominis, and/or obliques may be selected, and corresponding stimulus may be delivered specifically to those regions (e.g., via overlying cutaneous electrodes). Electrode sizes and shapes may be selected from a variety of alternatives so as to optimize stimulation and cause contraction of particular muscles or portions thereof and/or to avoid or minimize stimulation and contraction of other muscles or portions thereof. It is noted that "optimize", "optimal", and like terms as used herein do not require an absolute optimum or "best" among all possible alternatives but rather generally represent one or more preferred alternatives (e.g., for a particular purpose) among a variety of available alternatives. Such preferred alternatives may include the "best" alternative for a particular purpose.

The timing of delivery of the stimulus within the expiratory phase of breathing can vary. In some embodiments, delivery of the stimulus is triggered by the end of inspiration. In some embodiments delivery of the stimulus is triggered by the onset of exhalation (e.g., by the beginning of a decrease in lung volume) and may continue until the end of exhalation is detected. Accordingly, this may not be for a predetermined amount of time, but based on a subject's actual breathing pattern. A change in magnitude or slope or rate of change of slope of a quantity detected by a sensor (or a derived quantity such as tidal volume) can be used to detect, e.g., the onset of exhalation and/or the end of inspiration. In some embodiments, a peak detection or zero crossing detection algorithm may be used for one or more such purposes. As noted above, the delivery of the stimulus can start at a predetermined time after the end of inspiration or a predetermined time after the onset of exhalation. For example, delivery can begin between 0.5 sec and 3 sec after the onset of exhalation and last for an appropriate amount of time to cause contraction of muscles of exhalation but allow sufficient time for such muscles to at least in part cease contracting before inspiration begins. In some embodiments a stimulus lasts for between 1 and 1.5 seconds. In some embodiments, the stimulus delivery is timed so as to increase the force of contraction of expiratory muscles during the latter 0.5-1 seconds of exhalation. In some embodiments, a signal is provided to the stimulus device based on analyzing the subject's breathing, so as to terminate the stimulus in advance of or at the beginning of inspiration. Thus in some embodiments, at least two signals are provided to the stimulus device (within a respiratory cycle), wherein a first signal causes delivery of the stimulus and a second signal terminates delivery of the stimulus within that respiratory cycle. It will be understood that a second signal may be a change in one or more characteristics of a first signal. For example, a first signal may comprise a waveform. An alteration in the amplitude and/or frequency of the waveform may serve as a second signal. Different amplitudes and/or frequencies may encode multiple distinct instructions to the stimulus device.

In some embodiments of the invention, at least some muscles of inspiration are stimulated (electrically or magnetically) while a subject is inhaling. In other embodiments, such stimulus is not provided (or any such stimulus is insufficient to cause contraction or significant change in force generated by such muscles). For example, the diaphragm is not stimulated and/or the external intercostal muscles are not stimulated (or any such stimulus is insufficient to cause contraction or significant change in force generated by such muscles). In at least some embodiments of the invention, a stimulus is not delivered to the central nervous system. In at least some embodiments of the invention, a stimulus is not delivered to the phrenic nerve.

In some aspects, the system may comprise a RIP sensor or piezoelectric respiratory sensor in signal communication with an abdominal muscle stimulator (e.g., the electrode). In some embodiments, the sensor and abdominal muscle stimulator are directly connected via a conductive wire or cable. In some embodiments, the sensor and the abdominal muscle stimulator may be both connected to a component that accepts an input signal from the sensor and delivers an output signal to the abdominal muscle stimulator, wherein the output signal causes the abdominal muscle stimulator to stimulate at least some abdominal muscles, e.g., at least the rectus abdominis. The component can comprise appropriate electronics to analyze the signal received from the sensor, determine when exhalation is occurring, select appropriate stimulus parameters, and/or deliver an appropriately timed signal to the abdominal muscle stimulator so that the abdominal muscle stimulator will stimulate the abdominal muscles during exhalation.

In some embodiments, a subject's breathing pattern may be analyzed (e.g., using a spirometer) and/or one or more physical or neuromuscular characteristics such as chest and/or abdominal dimensions, expiratory and/or inspiratory muscle strength, sensitivity of efferent and/or afferent nerves supplying said muscles is/are assessed. The analysis may be used, e.g., to calibrate or select the sensors and/or stimulus device based at least in part on the subject's individual breathing pattern and/or physical characteristics. Appropriate parameters or ranges of parameters for the stimulus, electrode number and/or position, etc., may be selected (either automatically by a system or by a health care provider or other appropriately trained individual) to provide effective and well-tolerated stimulation. For example, the minimum electrical stimulus required to reliably elicit effective contraction of one or more expiratory muscles (e.g., the rectus abdominis) or to achieve a desired level of reduction in EELV and/or the maximum stimulus that may be delivered without causing undue discomfort may be determined. In some embodiments stimulus parameters that are the minimum required (e g, minimum current required) to produce observable contraction (e.g., observable to the naked eye) of a selected muscle or muscles of a particular subject are used. In some embodiments stimulus parameters at the maximum level (e.g., maximum current) that the subject can reasonably tolerate are used. In some embodiments stimulus parameters between the afore-mentioned minimum and maximum are used. Thus in some aspects, breathing assistance may be customizable based on a subject's individual characteristics.

In some embodiments an electrode for stimulating a neuromuscular response may be communicatively coupled with a system that is capable of detecting different breathing patterns, e.g., breathing patterns associated with cough, quiet breathing, breathing patterns associated with speaking, etc. Such a system may adjust one or more stimulation parameters and/or signal conditioning procedures based at least in part on detection of different breathing patterns. For example, stimulus intensity and/or duration may be altered based at least in part on the breathing pattern. In some embodiments stimulation is stopped during certain breathing types, e.g., breathing types associated with speaking, and, in at least some embodiments, stimulation is restarted automatically after a subject stops speaking. In some embodiments, detection of different breathing patterns is performed using a statistical classifier such as a maximum likelihood classifier or a Bayesian classifier. In some embodiments, detection of different breathing patterns is performed using thresholds, e.g., using the minimum amplitude of the sensor signal during inhalation to distinguish between cough and quiet breathing. In some embodiments, a set of breathing pattern "training examples" of different breathing types is acquired for a particular subject and used to generate a model or reference pattern that can be used to subsequently assign breathing patterns into one category or another. In some embodiments a model or reference pattern is generated for a subject in various positions, e.g., lying down, sitting, standing, walking. In some embodiments an algorithm based on a cross-correlation analysis of a subject's breathing pattern with one or more reference patterns for various breathing types in that subject may be used.

Any of various machine learning approaches known in the art may be used in various embodiments. In some embodiments a system may comprise or interface with an accessory sensor or device that detects subject movement that is not part of the breathing cycle, such as walking or voluntary movements during sleep such as turning over. Such sensor or device may comprise an accelerometer or may comprise an electrode placed on an arm or leg, for example. In some embodiments input from an accessory sensor or device is used to determine the nature or intensity of the subject's physical activity, and, in some embodiments, such information is used to adjust one or more stimulus parameters or signal conditioning parameters. For example, in some embodiments information regarding a subject's movement is used to determine whether input from a breathing sensor contains an artifact arising from movement that is not part of the breathing cycle.

Referring now to FIG. 1, a respiration-stimulating electrode 2 ("electrode") is shown. The electrode 2 may generally include a backing layer 6, an electrode layer 8, and a hydrogel layer 10. The electrode 2 may also include an electrode cable 12 that may include a connector 14. The electrode 2 may be divided into a first removable portion 16 that may include a first removable activation area 18, a second removable portion 20 that may include a second removable activation area 22, and a main body 24 that may include a main activation area 26. In embodiments, the first removable portion 16 may be configured to separate from the second removable portion 20 and the main body 24 by a first perforation 28. The second removable portion 20 may be configured to separate from the main body 24 by a second perforation 30. The electrode 2 may be applicable to an activation location on a patient to simulate respiration as described in greater detail herein.

The backing layer 6 may comprise a foam backing that provides support and houses the electrode layer 8. In some embodiments, the backing layer 6 may comprise a single coat of polyethylene ("PE") foam. The backing layer 6 may include one or more illustrations, graphics, or other demonstrations for demonstrating application of the electrode to a user of the device. That is the illustration may provide application instructions or procedures that may distinguish the application or application location to a user. Additionally, the illustration may include one or markings or designations suited to distinguish a particular electrode from another.

The electrode layer 8 may comprise an activation area 17. The activation area 17 may generally be that area of electro-conductive material that conducts the electric charge from the electrode cable through the hydrogel layer to the skin or other treatment surface of a subject. The activation area 17 may be reduced in size by separating portions of the activation area from the main body 24. For example, the activation area 17 may be reduced in size by removing the first removable activation area 18 and the second removable activation area 22. The electro-conductive material comprising the electrode layer 8 may be, for example, a silver-loaded carbon, a silver-coated vinyl, a silver-coated carbon-loaded vinyl, or the like.

In some embodiments, a border area 32 may surround one or more of the first removable activation area 18, the second removable activation area 22, and the main activation area 26 and serve as a buffer between the activation area 17 of the electrode layer 8 and an edge 48 of the electrode 2. Generally, edge portions of an electrode may interface with air and other external constituents more than areas inside the edges of the electrode, which may cause drying out and/or shrinkage of the edge areas of the electrode. Additionally, edge portions of an electrode may touched or pulled by a user or subject. Hence, edge portions may separate from a subject's skin. If electrical stimulation is applied at the edges of an electrode and the edges of the electrode separate from the subject's skin leaving an air gap, an arc may develop across the air gap. The arc may cause pain or burn a subject's skin. This sensation may be referred to as "biting" from "hotspots" caused by the electrode. The border area 32 may serve to provide a buffer between the edge 48 and the activation areas of the electrode 2 to prevent edge biting or hot spots at the edge of the electrode 2. The border area 32 may be any dimension, for example, the edge 48 of the electrode 2 may extend 2.5 mm beyond the activation area around the entire activation area (i.e., the border may be, for example, 2.5 mm in width).

The corners of each of the first removable activation area 18, the second removable activation area 22, and the main activation area 26 may be rounded. The activation areas may have rounded corners to prevent arcing and/or hotspotting as described in greater detail herein.

The hydrogel layer 10 may comprise a high concentration of water and may serve as an interface between the electrode layer 8 and the skin or other application location of the subject. The hydrogel layer 10 may provide efficient conduction of the electrical stimulation from the electrode layer 8 and may include adhesive characteristics that provide for attachment to the subject's skin.

The electrode cable 12 may electrically couple the electrode layer 8 with a power source for activating the electrode 2 to provide a stimulus to the subject. The electrode cable 12 may be, for example, a braided metallic cable (e.g., copper, silver, etc.). The electrode cable 12 may have, for example, a polyvinyl chloride ("PVC") coating that electrically isolates the electrode cable 12 from other components of the system. The electrode cable 12 may electrically couple the electrode layer 8 with a power source (not shown) via the connector 14. The connector 14 may provide a quick release or decoupling device.

Still referring to FIG. 1, the electrode 2 may comprise multiple removable portions that may separate from the main body 24 of the electrode 2. In the particular embodiment shown, the electrode 2 comprises three total portions: the first removable portion 16, the second removable portion 20, and the main body 24. However, it is to be understood that other embodiments of the electrode 2 may include more or fewer portions, which more or fewer portions may be removable or not. For example, an embodiment may include two portions, four portions, five portions, etc. The first removable portion 16 may have a length dimension 58, the second removable portion 20 may have a length dimension 60, and the main body 24 may have a length 62. The overall length of the electrode 2 may change as described herein. While the depicted embodiment of FIG. 1 shows a first removable portion 16 and second removable portion 20 of different lengths, each of which is different than the length of the main body 24, it is to be understood that embodiments are not limited to this arrangement and that various portions of different embodiments may have any length.

As depicted in FIG. 1, the first removable portion 16 and the second removable portion 20 are removable by tearing or otherwise separating the respective removable portion from the main body at the respective perforation line. However, it is to be understood that the first removable portion 16 and the second removable portion 20 may be removed via other means. For example, the first removable portion 16 and/or the second removable portion 20 may be removed from the main body 24 via cutting, tearing, etc. In some embodiments, the electrode 2 may include an indicator or other marking (e.g., a guide line) that indicates where a particular portion ends and another begins for removal of the particular portion via, for example, scissors.

Removal of the first removable portion 16 and/or the second removable portion 20 may adjust an activation length of the electrode 2 and thus change the dimensions of the activation area 17 of the electrode 2. The activation area 17 of the electrode 2 is generally the area of the electrode 2 that conducts electrical stimulation from the electrode 2 to a subject. Hence, removal of the first removable activation area 18 reduces the total activation area of the electrode 2 by an area equal to that of the first removable activation area 18 and removal of the second removable activation area 22 reduces the total activation area of the electrode 2 by an area equal to that of the second removable activation area 22. In the depicted embodiment, removal of the first removable activation area 18 and the second removable activation area 22 would leave the electrode 2 with only the main activation area 26 as the active activation area. It is to be understood that the arrangement, location, and number of removable portions can be changed without deviating from the scope of the present application. That is, embodiments of the present application may include more or fewer than two removable portions and the removable portions may be located and configured differently than that shown in the figures. For example, an electrode may comprise a main body that includes a first removable portion and a second removable portion on opposite or neighboring sides of the main body. In yet other embodiments, a first portion and second portion may surround some or all of a main body. For example, the main body may be generally circular in shape and a second removable portion and a first removable portion may be generally concentric with the circular main body and have increasing radiuses, respectively.

As a subject progresses through a regimen of respiratory therapy (e.g., on a MV, using NMES, and/or the like), his or her respiratory capacity may change. For example, a subject's respiratory capacity may increase. In general, a subject with increased respiratory capacity may require less neuromuscular electrical stimulation to achieve the same respiratory effect. Removal of the first removable portion 16 and the second removable portion 20 from the electrode 2 allow for the reduction in activation area for a given patient without the need to completely remove the electrode 2. Moreover, removal of the first removable portion 16 and the second removable portion 20 can be accomplished while the electrode 2 is adhesively coupled to a subject, reducing the complications that can arise from re-attaching an electrode (e.g., loss of adhesion, improper placement upon reattachment, etc.). Hence, a patient can continue respiratory therapy or assistance uninterrupted, reducing recovery times and increasing effectiveness of treatment.

Figure 2:
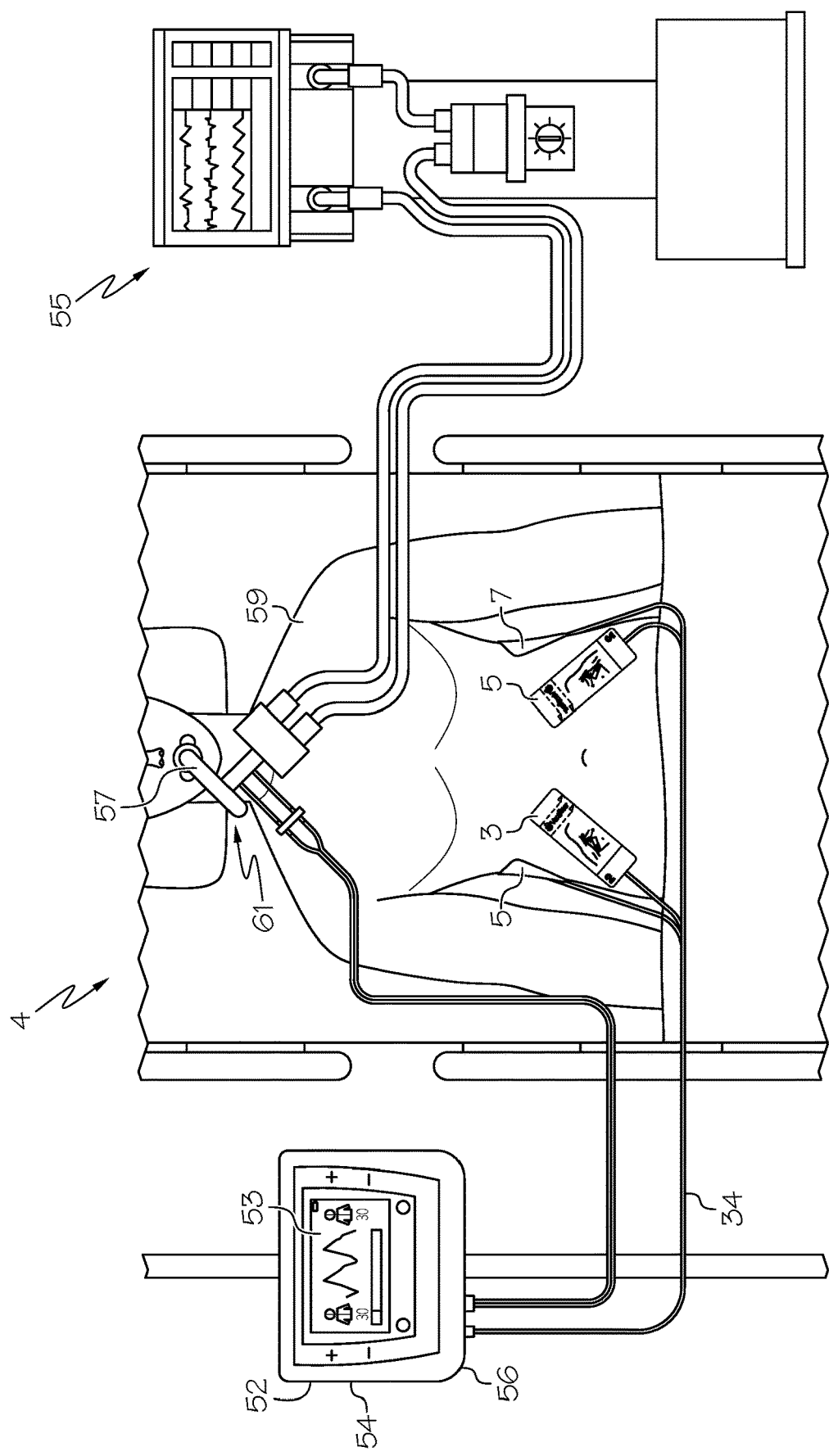
FIG. 2 depicts an exploded view of an electrode including a backing layer, an electrode layer, and a hydrogel layer according to one or more embodiments shown and described herein.

Together, FIGS. 1 and 2 show a system 4 for stimulating respiration. The system 4 includes four electrodes: a right posterior electrode 9, a right anterior electrode 3, a left anterior electrode 5, and a left posterior electrode 7. The system 4 further includes a controller 52 that includes a power supply 54 and a memory 56. The controller 52 includes a graphical user interface 53 (GUI) that enables a user to interact with the system 4. The system includes a mechanical ventilator 55 that is pneumatically coupled with a breathing apparatus 57 in a subject 59. A sensor 61 is pneumatically coupled to the breathing apparatus 57 and electronically coupled to the controller 52. The controller 52 is communicatively coupled with the electrodes 3, 5, 7, 9 via a system cable 34. As shown in FIG. 2, the electrodes 3, 5, 7, 9 may be placed on the subject 59 and controlled by the controller 52 to generate an electrical signal at the electrodes 3, 5, 7, 9 to stimulate the neuromuscular system of the subject 59. Because not all subjects are the same size and shape, the size and shape of the electrodes 3, 5, 7, 9 can be altered as described herein to alter the activation area 17 of the electrode to properly fit a particular subject.

Figures 3A, 3B:
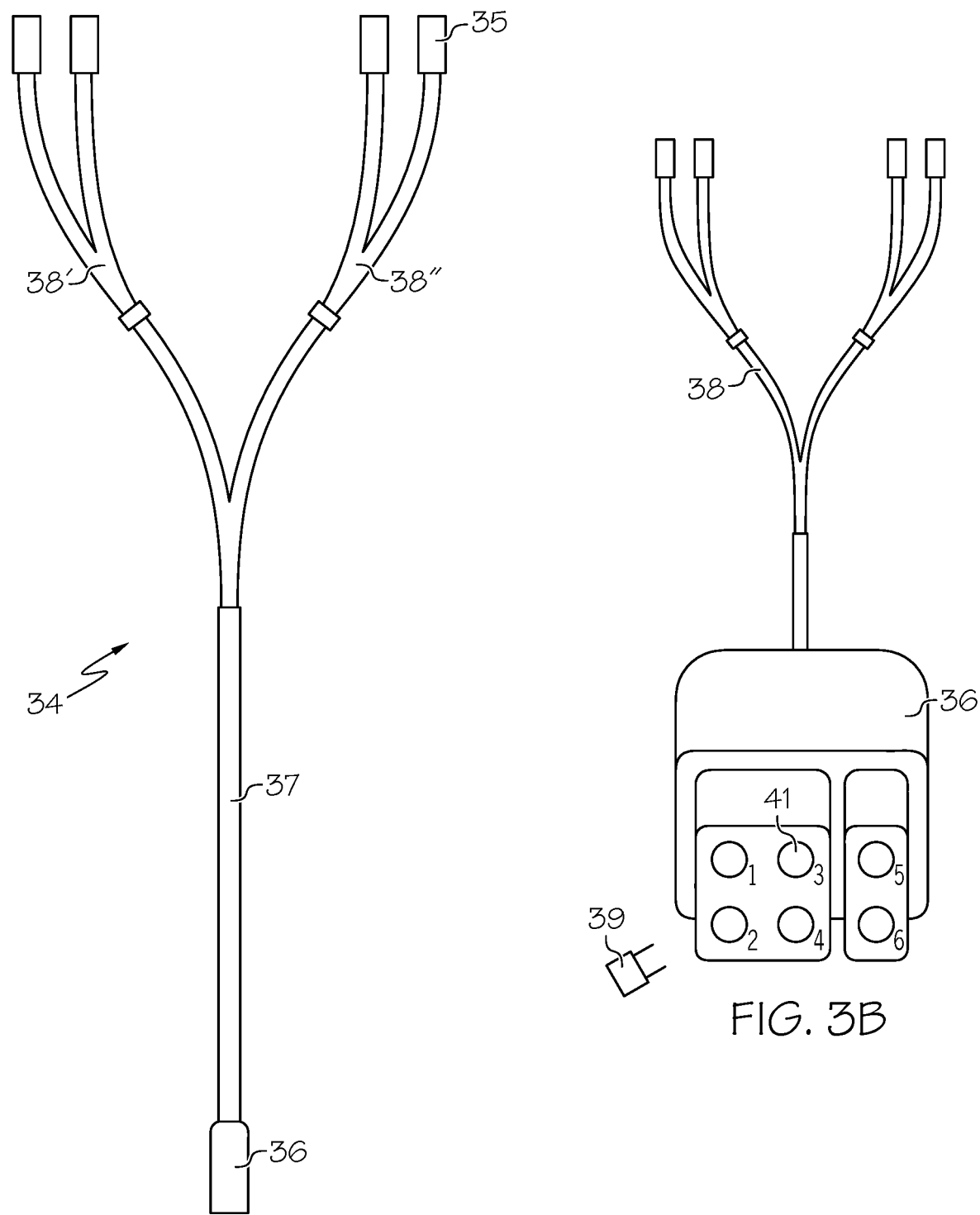
FIG. 3A depicts a system cable for connecting one or more electrodes to a system according to one or more embodiments shown and described herein.
FIG. 3B depicts a system connector for connecting the system cable of FIG. 3A to the system of FIG. 1 according to one or more embodiments shown and described herein.

Referring not to FIGS. 3A and 3B, the system cable 34 is shown. The system cable 34 may be, for example, a braided, copper wire insulated with PVC. The system cable 34 may have a base portion 37 and one or more electrode portions 38. The electrode portion 38 may be divided into separate branches based on the number of electrodes to be coupled to that particular electrode portion 38. In the particular embodiments shown, a first electrode portion 38' and a second electrode portion 38" are each divided into two branches to connect to two electrodes, each. But this is just an illustration. It is to be understood that the electrode portion could be divided into any number of branches. The system cable 34 may couple to the electrode at an electrode coupling 35 and to the system 4 (not shown in FIGS. 3A and 3B) at a system connector 36. In embodiments, the electrode coupling 35 and the electrode connector 14 (FIG. 1) may be correspondingly mechanically keyed such that it is impossible to connect the incorrect electrode portion 38 of the system cable 34 to the incorrect electrode 2. The system connector 36 may include a memory device 39 that may be communicatively coupled to the controller 52 (FIG. 2). The controller 52 is configured to access information stored on the memory device 39.

The memory device 39 may be, for example, an electrically erasable programmable read-only memory (EEPROM). In other embodiments, the memory device 39 may be, for example, a radio-frequency identification (RFID) chip, a near-field communication (NFC) device, a barcode, etc. The memory device 39 may store information about the system 4 and/or the individual electrodes connected thereto. For example, the memory device 39 may store a date of manufacture, a lot number, a count of the number of uses, a shelf life, an expiration date, etc. The memory device 39 may communicatively couple to the system connector 36 at one or more ports 41 in the system connector 36. While the particular embodiment depicted in FIGS. 3A and 3B shows a system cable 34 for connecting to four electrodes, it is to be understood that the system 4 can include any number of electrodes and that embodiments are not limited to the number of electrodes or other components depicted in the figures. While the depicted embodiment shows the memory device 39 inside the system connector 36, it is to be understood that the memory device 39 may be in other locations. For example, the memory device may be a bar code, NFC tag, RFID chip, etc. on the electrode 2 (e.g., on the backing layer 6), on the pouch 70 (FIG. 6A/6B), or on the electrode backing sheet 40 (FIG. 4).

In some embodiments, the base portion 37 and the one or more electrode portions 38 may be distinctly colored to immediately signal a function of a portion of the system cable 34 to a user or to compare one portion of the system 4 to another portion of the system 4. For example, the first electrode portion 38' may be blue and the second electrode portion 38" may be grey to signify immediately to a user that electrodes electrically coupled to the respective portion are to be placed at a particular location on a patient's body.

Figure 4:
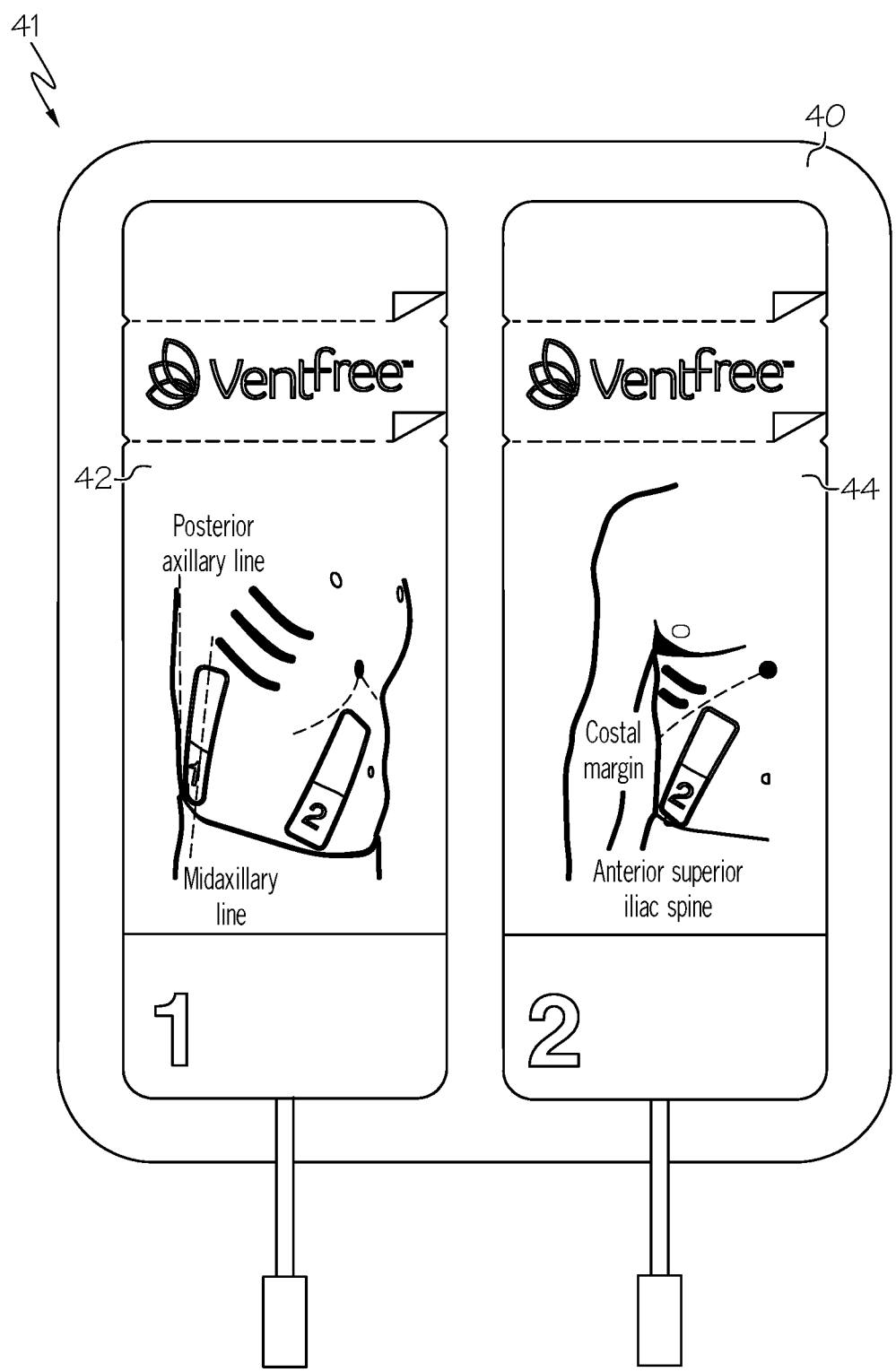
FIG. 4 depicts a pair of electrodes coupled to an electrode backing sheet according to one or more embodiments shown and described herein.

Referring now to FIG. 4, an electrode pair on an electrode backing sheet 40 is shown. The electrode pair 41 includes a first electrode 42 and a second electrode 44 that may be removably coupled to the electrode backing sheet. The electrode pair 41 may be, for example, removably adhered to the electrode backing sheet 40. A user may peel the electrode pair 41 from the electrode backing sheet 40 in order to apply the first electrode 42 and the second electrode 44.

Figure 5:
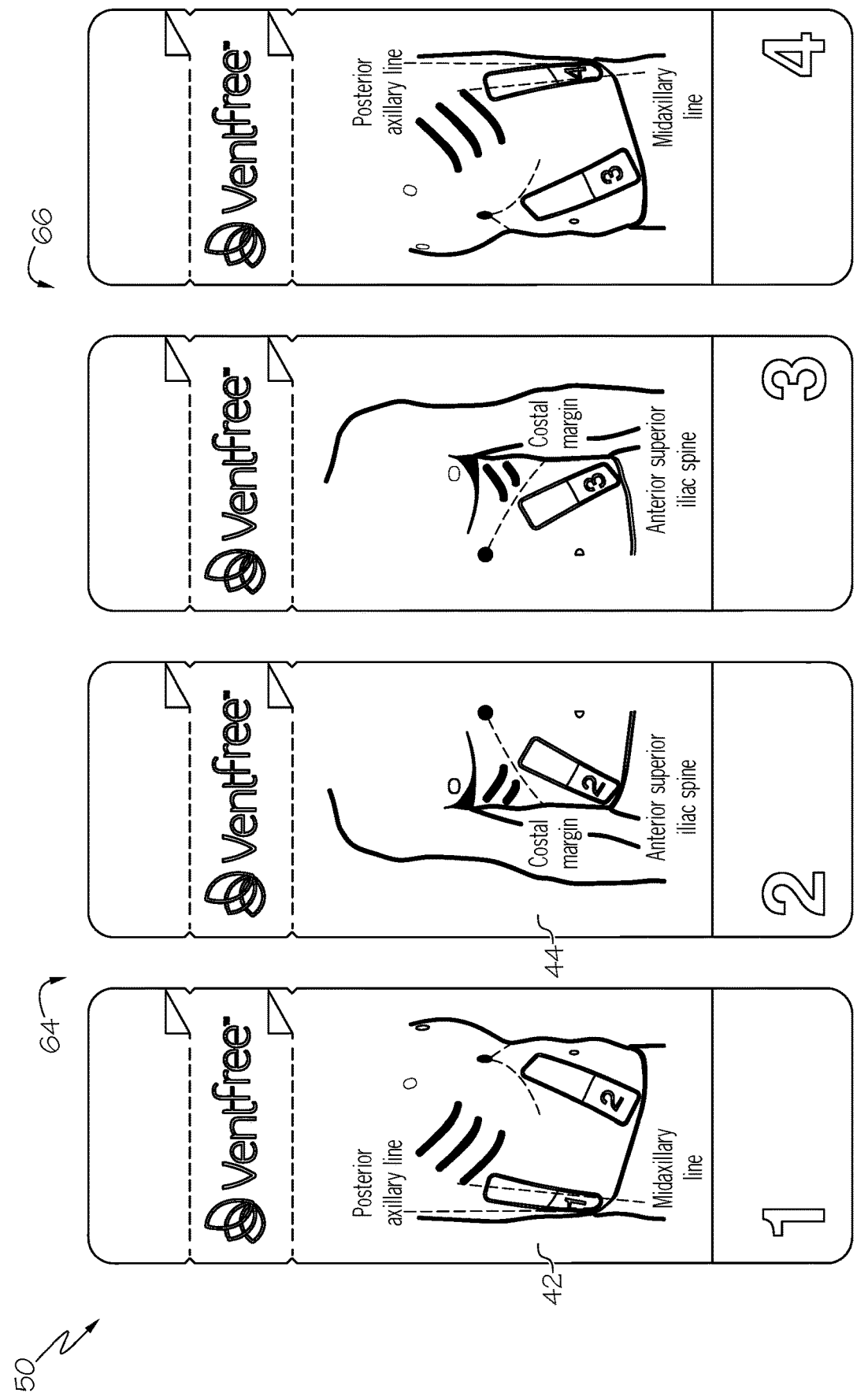
FIG. 5 depicts an electrode set according to one or more embodiments shown and described herein.

Referring now to FIG. 5, an exemplary set 50 of electrodes are shown. The set 50 of electrodes includes a first electrode pair 64 and a second electrode pair 66. The first electrode pair 64 includes the first electrode 42 and the second electrode 44. The second electrode pair 66 includes substantially similar electrodes. As depicted, the first electrode pair 64 may include a graphic or illustration that demonstrates the placement of the particular electrode pair. For example, the first electrode 42 may be generally intended for location at an activation location between a subject's costal margin and anterior iliac spine. The second electrode 44 may be generally intended for placement at a location between a subject's midaxillary line and posterior axillary line. However, it is to be understood that such specific placement locations do not limit the scope of the claims. Additionally, the illustration could be included on various portions of the assembly. For example, the illustration may be included on the electrode backing sheet 40 (FIG. 4) and/or in a separate insert (not shown) that is included in the pouch 70 (FIGS. 6A/6B).

Referring to FIGS. 2 and 5, each of the electrodes of the first electrode pair 64 and the second electrode pair 66 may be electrically coupled to the controller 52, power supply 54, and memory 56 of the system 4 through the system connector 36. A user may place the first electrode pair 64 and the second electrode pair 66 in the appropriate location on a subject and the system 4 may be activated to electrically stimulate the neuromuscular system of the subject. In some embodiments, the first electrode pair 64 and the second electrode pair 66 may be configured to generally correspond to opposite sides of the subject's body, thereby capable of stimulating coordinated, substantially symmetric signals to the subject's neuromuscular system across his or her pulmonary system and respiratory muscles. However, embodiments are not limited to this arrangement.

In some embodiments, distinguishing features illustrated on an electrode backing may correspond to one or more features of software used to control the system. For example, with reference to FIGS. 2 and 5, illustrations on the first electrode pair 64 and the second electrode pair 66 may correspond to illustrations depicted with the GUI 53. The memory 56 may contain one or more graphical image files that may display to a user how or where to place the one or more electrodes and may include information such as patient health data, personal information, characteristics such as height and weight, and particularized application instructions, for example.

Generally referring to FIGS. 1-5, some embodiments of the system 4 may include a means for determining which size electrode should be used for a subject. For example, a distance between two anatomical locations or anatomical markers (e.g., anterior superior iliac spine and sternum) on a subject's body may be measured (e.g., using a ruler, tape measure, or other measuring device) and this measurement may be used to determine the proper size or length of electrode that should be used. In some embodiments, the electrode backing sheet 40 or one or more of the cables (e.g., the system cable 34) may include a graded measuring device for measuring a subject's body. In some embodiments, a separate measuring device may be included in the pouch 70 (FIGS. 6A/6B). In some embodiments, the system 4 may be used to receive a measurement input and generate application instructions for a particular user based on the measurement input or other information. In some embodiments, the system 4 may communicatively couple to one or more external networks (e.g., cloud computing system, the Internet, external storage media, etc.) via a communicative connection with the external network. In some embodiments, electrode size may be determined by capturing an image of the subject (e.g., using a smartphone or camera) and the measurements may automatically be recorded based on processing the image using software accessible by the image-capturing device.

Figure 6B:
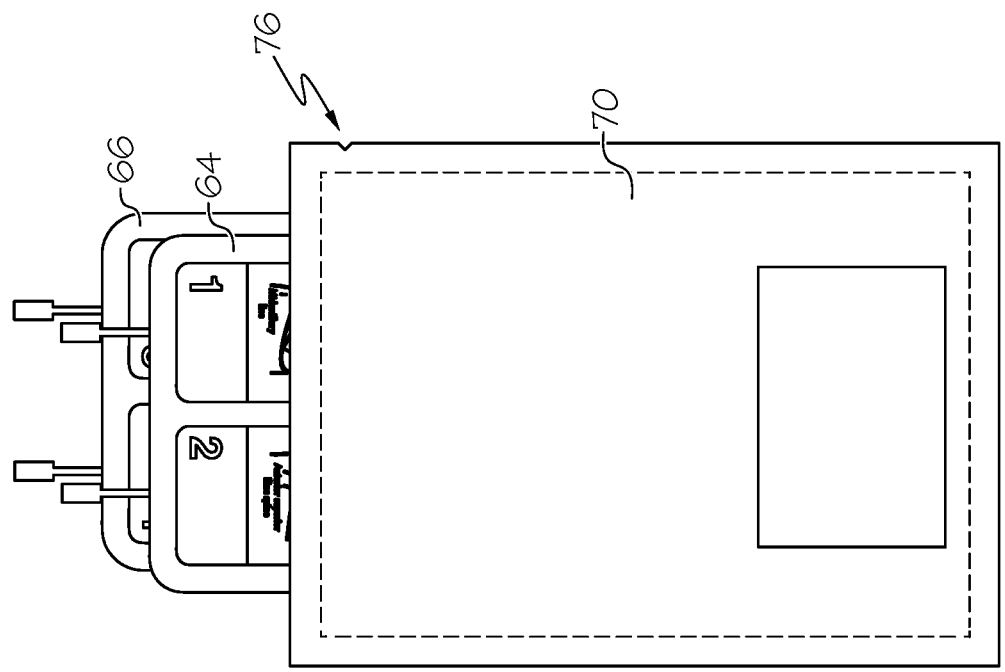
FIG. 6B depicts a back view of an electrode pout assembly according to one or more embodiments shown and described herein.
Figure 6A:
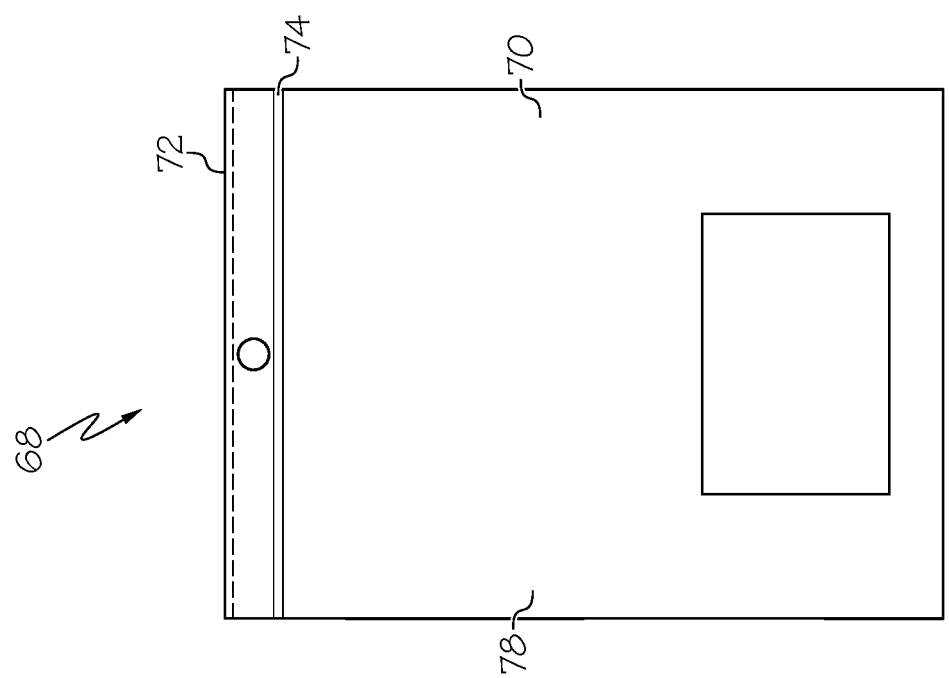
FIG. 6A depicts a front view of an electrode pouch assembly according to one or more embodiments shown and described herein.

Referring now to FIGS. 6A and 6B, an electrode pouch assembly 68 is shown. The electrode pouch assembly 68 includes a pouch 70, which may include a tear-away portion 72 and a closure 74 that may open and close to access the pouch 70. In some embodiments, the tear-away portion 72 may tear away at a notch 76. The tear-away portion 72 may be a portion separate from a main body 78 of the pouch 70 by a perforation and may indicate non-use of the electrode pouch assembly 68. That is, if the tear-away portion 72 is intact, attached to the pouch 70, the contents within the pouch 70 have not been used. The pouch 70 may hold one or more electrodes 2 (FIG. 1) and/or one or more electrode pairs such as the first electrode pair 64 and the second electrode pair 66. The closure 74 may be, for example, a zip closure that zips and unzips to provide access to the pouch 70.

It should now be understood that neuromuscular disorders, such as COPD and COVID-19, may be treated using NMES. NMES may be implemented in a subject via a system capable of generating an electrical stimulus in an electrode. The electrode may be removably coupled to a subject's skin. The electrode may include a first removable portion and a second removable portion that may be removed from a main body to change an activation area of the electrode. Thus, systems for treating a subject using NMES may be equipped with adaptably sized electrodes offering subjects more adaptive treatment options.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electrode for stimulating a neuromuscular response comprising:
   a backing layer, an electrode layer, and a hydrogel layer; and
   an electrode cable configured to provide an electrical signal to the electrode;
wherein:
   the electrode is divided into a first removable portion including a first removable activation area, a second removable portion including a second removable activation area, and a main body including a main activation area,
   the first removable portion is configured to separate from the second removable portion and the main body by a first perforation,
   the second removable portion is configured to separate from the main body by a second perforation,
   the electrode layer comprises a border of nonzero width that:
      completely separates an activation area from an edge of the electrode;
      completely separates the first removable activation area from the second removable activation area and the main activation area; and
      completely separates the second removable activation area from the main activation area, and
   of the main activation area, the first removable activation area, and the second removable activation area, only the main activation area is directly connected to a cable.

2. The electrode of claim 1, the first removable activation area, the second removable activation area, and the main activation area comprise rounded corners.

3. The electrode of claim 1, wherein a length of the main body is about 11 cm, the length of the second removable portion is about 2 cm, and the length of the first removable portion is about 2 cm, such that an overall length of the electrode is about 15 cm.

4. The electrode of claim 1, wherein a length of the first removable portion and of the second removable portion is equal.

5. The electrode of claim 1, wherein a length of the first removable portion and of the second removable portion is different.

6. The electrode of claim 1, wherein the first removable activation area, the second removable activation area, and the main activation area comprise silver-loaded carbon.

7. The electrode of claim 1, wherein the hydrogel layer comprises an electro-conductive gel and completely surrounds each of the first removable activation area, the second removable activation area, and the main activation area.

8. The electrode according to claim 1, wherein one or more of the removable portions of the electrode is distinctly colored to correspond to a respective function, use, or location for placement on a human body.

9. The electrode according to claim 1, wherein the backing layer comprises illustrations, markings, or instructions for applying the electrode.

10. The electrode according to claim 1, further comprising a read-only memory device provided on the backing layer.

11. A system for stimulating respiration comprising:
a controller;
a power supply;
a memory device; and
at least one electrode pair, each electrode of the at least one electrode pair comprising:
a backing layer, an electrode layer, and a hydrogel layer; and
an electrode cable configured to provide an electrical signal to the electrode,
wherein:
the controller controls the electrical signal to each of the electrodes from the power supply through the respective electrode cable and the controller is communicatively coupled with the memory device, the controller is communicatively coupled with the electrode via a system cable;
each of the electrodes is divided into a first removable portion including a first removable activation area, a second removable portion including a second removable activation area, and a main body including a main activation area,
the first removable portion is configured to separate from the second removable portion and the main body by a first perforation,
the second removable portion is configured to separate from the main body by a second perforation,
the memory device is located within the system cable,
the electrode layer comprises a border of nonzero width that:
completely separates an activation area from an edge of the electrode;
completely separates the first removable activation area from the second removable activation area and the main activation area; and
completely separates the second removable activation area from the main activation area, and
of the main activation area, the first removable activation area, and the second removable activation area, only the main activation area is directly connected to a cable.

12. The system of claim 11, wherein a length of the first removable portion and of the second removable portion is equal.

13. The system of claim 11, wherein the at least one electrode pair comprises an anterior electrode and a lateral-posterior electrode and the electrode cables of the anterior electrode and the lateral-posterior electrode are communicatively coupled to the controller and the controller controls the electrical signal to the anterior electrode and the posterior electrode to coordinate actuation of each.

14. A method of treating a respiratory disorder in a subject using neuromuscular electrical stimulation comprising:
providing a controller, a power supply, and at least one electrode pair, each electrode of the electrode pair comprising: a backing layer, an electrode layer, a hydrogel layer, and an electrode cable configured to provide an electrical signal to the electrode, each electrode being divided into a first removable portion including a first removable activation area, a second removable portion including a second removable activation area, and a main body including a main activation area;
adhering the at least one electrode pair to the subject;
generating the electrical signal using the controller and the power supply; and
supplying the electrical signal to each of the electrodes of the at least one electrode pair to provide an electrical stimulus, wherein
the electrode layer comprises a border of nonzero width that:
completely separates an activation area from an edge of the electrode;
completely separates the first removable activation area from the second removable activation area and the main activation area; and
completely separates the second removable activation area from the main activation area, and
of the main activation area, the first removable activation area, and the second removable activation area, only the main activation area is directly connected to a cable.

15. The method of claim 14, further comprising removing the first removable portion of at least one of the electrodes of the electrode pair to reduce an activation area of the electrode.

16. The method of claim 15, further comprising removing the second removable portion of at least one of the electrodes of the electrode pair to further reduce the activation area of the electrode.

17. The method of claim 14, further comprising varying one or more of a frequency, amplitude, duty cycle, pulse shape, pulse width, pulse duration of the electrical signal.

18. The method of claim 14, wherein
the at least one electrode pair comprises an anterior electrode and a posterior electrode,
the anterior electrode is generally disposed between a costal margin and an anterior superior iliac spine of the subject, and
the posterior electrode is generally disposed between a midaxillary line and a posterior axillary line of the subject.

19. The method according to claim 14, further comprising the steps of:
removing, after the electrical stimulus is provided, the first removable portion of at least one electrode from the subject while the second removable portion and the main body remain adhered to the subject; and
supplying, after removal of the first removable portion, a subsequent electrical signal to each of the electrodes of the at least one electrode pair to provide a subsequent electrical stimulus.

* * * * *